(12) United States Patent
Pauken et al.

(10) Patent No.: US 11,433,580 B2
(45) Date of Patent: Sep. 6, 2022

(54) METHOD TO CHASE WELD LINES BY TIMING AND POSITIONING OF GATES

(71) Applicant: Ford Motor Company, Dearborn, MI (US)

(72) Inventors: Junko Pauken, Canton, MI (US); Haoliang Michael Sun, Rochester Hills, MI (US)

(73) Assignee: Ford Motor Company, Dearborn, MI (US)

( * ) Notice: Subject to any disclaimer, the term of this patent is extended or adjusted under 35 U.S.C. 154(b) by 571 days.

(21) Appl. No.: 15/953,571

(22) Filed: Apr. 16, 2018

(65) Prior Publication Data

US 2018/0229408 A1 Aug. 16, 2018

Related U.S. Application Data

(63) Continuation of application No. PCT/US2015/056374, filed on Oct. 20, 2015.

(51) Int. Cl.
*B29C 45/76* (2006.01)
*B29C 45/00* (2006.01)
(Continued)

(52) U.S. Cl.
CPC ...... *B29C 45/0025* (2013.01); *B29C 45/2708* (2013.01); *B29C 45/76* (2013.01);
(Continued)

(58) Field of Classification Search
CPC . B29C 45/0025; B29C 45/7613; B29C 45/76; B29C 2045/0032; B29C 2945/76003; B29C 2945/76287
See application file for complete search history.

(56) References Cited

U.S. PATENT DOCUMENTS

| 5,556,582 A | * | 9/1996 | Kazmer | B29C 45/77 264/328.8 |
| 5,762,855 A | * | 6/1998 | Betters | B29C 45/0025 264/328.13 |

(Continued)

FOREIGN PATENT DOCUMENTS

| CN | 103213239 | 7/2013 |
| JP | S62198423 | 9/1987 |
| JP | H01171917 | 7/1989 |

OTHER PUBLICATIONS

International Search Report for International Application PCT/US2015/056374, dated Jan. 6, 2016.

(Continued)

*Primary Examiner* — Alison L Hindenlang
*Assistant Examiner* — Debjani Roy
(74) *Attorney, Agent, or Firm* — Burris Law, PLLC

(57) ABSTRACT

An apparatus and method for eliminating mold lines when molding a part having ferromagnetic pigments is provided. A mold assembly having a mold with a cavity and valve gates is formed. Pucks are fitted at the gates to collect residual cold plastic. The calculation of a specific sequence and timing of the opening of the valve gates is determined based on a calculation of the total number of valve gates needed to fill a part while maintaining acceptable injection molding pressure. Once calculated, the gates are positioned around the mold cavity to balance flow length ratio. A primary gate is chosen for initial injection. The time for the material to flow from the first to the second gate is established. The second gate is opened after the flow front reaches the second gate. This pattern continues until all valve gates are opened.

15 Claims, 3 Drawing Sheets

(51) Int. Cl.
  *G06F 17/00* (2019.01)
  *B29C 45/77* (2006.01)
  *B29C 45/27* (2006.01)
  *B29K 105/00* (2006.01)
  *G05B 19/18* (2006.01)
  *B29C 45/28* (2006.01)

(52) U.S. Cl.
  CPC .......... *B29C 45/7613* (2013.01); *B29C 45/77* (2013.01); *G06F 17/00* (2013.01); *B29C 45/2806* (2013.01); *B29C 2045/0032* (2013.01); *B29C 2045/2709* (2013.01); *B29C 2945/76003* (2013.01); *B29C 2945/7627* (2013.01); *B29C 2945/76066* (2013.01); *B29C 2945/76083* (2013.01); *B29C 2945/76277* (2013.01); *B29C 2945/76287* (2013.01); *B29C 2945/76381* (2013.01); *B29C 2945/76551* (2013.01); *B29C 2945/76749* (2013.01); *B29C 2945/76755* (2013.01); *B29K 2105/0032* (2013.01); *B29K 2995/0008* (2013.01); *G05B 19/18* (2013.01)

(56) References Cited

U.S. PATENT DOCUMENTS

| | | |
|---|---|---|
| 6,099,767 A | 8/2000 | Tarr et al. |
| 6,558,605 B1 | 5/2003 | Wilson |
| 2005/0082706 A1 | 4/2005 | Nagaoka et al. |
| 2007/0199673 A1 | 8/2007 | Manda |
| 2012/0248652 A1* | 10/2012 | Galati .................... B29C 45/76 264/328.12 |
| 2013/0123424 A1 | 5/2013 | Kowalski et al. |

OTHER PUBLICATIONS

European Search Report for European Application 15906818.8, dated Mar. 29, 2019.
Knights, Mikell, Sequential Valve Gating, Plastics Technology, Dec. 1, 2003, available at URL https://www.ptonline.com/articles/sequential-valve-gating.
MHS Mold Hotrunner Solutions, Cascade Molding, 2014, available at URL http://www.mhs-hotrunners.com/cascadeinjection.html.
Javierre, C et al., Criteria on Feeding System Design: Conventional and Sequential Injection Moulding, Journal of Materials Processing Technology vol. 171(3), pp. 373-384, 2006, Elsevier Publishing.
Homes, W., Kaskadenspülzgießen vermeidet Bindenähte, Kunststoffe vol. 86 (9), pp. 1268-1272, 1996, Munchen.
Zhai, et al., Design Optimization of Location and Number of Injection Mold Gates, Journal of Chemical Industry and Engineering(China), Aug. 2003, p. 1142, vol. 54(8).
Yu, et al., The Optimization of Gate Locations in Injection Molds Based on Flow Balance, Polymer Materials Science and Engineering, May 2004, vol. 20(3), pp. 159-162, China Academic Journal Electronic Publishing House, 1994-2020.

* cited by examiner

METHOD TO CHASE WELD LINES BY TIMING AND POSITIONING OF GATES

CROSS-REFERENCE TO RELATED APPLICATIONS

This application is a continuation of International Application No. PCT/US2015/056374, filed on Oct. 20, 2015. The disclosure of the above application is incorporated herein by reference.

FIELD

The present disclosure relates to injection molding methods of material having a molded-in metallic pigment. More particularly, the present disclosure relates to a method for the injection molding of material having dispersed metallic pigment when forming a molded-in metallic part.

BACKGROUND

The statements in this section merely provide background information related to the present disclosure and may not constitute prior art.

Popular color trends in consumer products include various metallic or polychromatic paint colors. The appearance of stainless steel in kitchen appliances and metallic surfaces on electronic products are very popular among consumers. Enthusiasm for metallic paint extends to exterior paint schemes for automotive vehicles. This type of paint is often preferred by vehicle buyers as it highlights the contours and bodywork of the vehicle more than solid paint. Metallic paint also renders the paint a sparkling effect, thus adding to the overall attractiveness of the vehicle.

As an extension of exterior metallic paint, vehicle purchasers also frequently prefer metallic decorative parts in the automotive interior. Some of these interior components are made out of actual metal. However, many of them are made out of other materials such as plastic and are then decorated to appear to be metal.

One way to decorate plastic is to overcoat the substrate using a paint or a film, but this approach can be relatively expensive and is prone to imperfections. In order to reduce manufacturing cost, many companies are working on perfecting injection molding methods using metallic pigment in the resins in an effort to eliminate the painting process.

While the theory has merit, in practice manufacturers have found that when using metallic pigment in resins, the orientation of the metallic pigment in the resin cannot be controlled. As a result, the metallic pigment sometimes shows up as flow marks or dark spots on the A-surface. In addition, when the part being molded is relatively thick, metallic pigment is often wasted since the pigment is only needed on the A-surface.

An additional challenge faced by manufacturers when forming molded-in metallic parts relates to operation of the mold cavity during the injection molding process. During the molding process, molten plastic enters a mold through a sprue and goes through series of runners. Molten plastic then enters the tool cavity through gates. When there are multiple gates to form a part, flow fronts meet and form weld lines during the molding process. Visible weld lines are considered as surface defects and not acceptable for class-A surface parts. Minimizing weld lines is important since a part is weaker at the weld line.

Accordingly, an efficient and economical method to mold vehicle interior components using a metallic pigment in the resin that avoids flow marks, dark spots or weld lines while minimizing wastage is a desirable goal for automotive manufacturers.

SUMMARY

The present disclosure provides a method and apparatus for forming parts having metallic pigments. According to the present disclosure, a sequential valve gate system having a specific timing gate opening sequence is used to inhibit weld lines.

Initially, a mold assembly having a mold with a cavity and an array of gates is formed. At each gate, a large puck is fitted to collect any cold plastic that may remain after the previous shot. Once the mold assembly is formed, the calculation of gate opening and positioning is undertaken.

To make the calculations of gate opening and gate positioning, the specific sequential valve gate operating system and timing gate opening sequence is based initially on a calculation of the total number of gates needed to fill a part while maintaining acceptable, or a predetermined, injection molding pressure. Once this initial calculation is made, the gates are positioned around a mold cavity to balance flow length ratio. The primary gate is then chosen. After this selection, the flowing material is injected and the timing for the flow from the first gate to the second gate is established. The second gate is then opened immediately after the flow front passes the third gate. This pattern continues until all of the gates are opened.

According to the method of the present disclosure, where a part without a hole or an opening is being formed, weld lines can be positioned or inhibited by proper gate location and sequencing gate opening.

The above advantages and other advantages and features will be readily apparent from the following detailed description of the present disclosure when taken in connection with the accompanying drawings.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
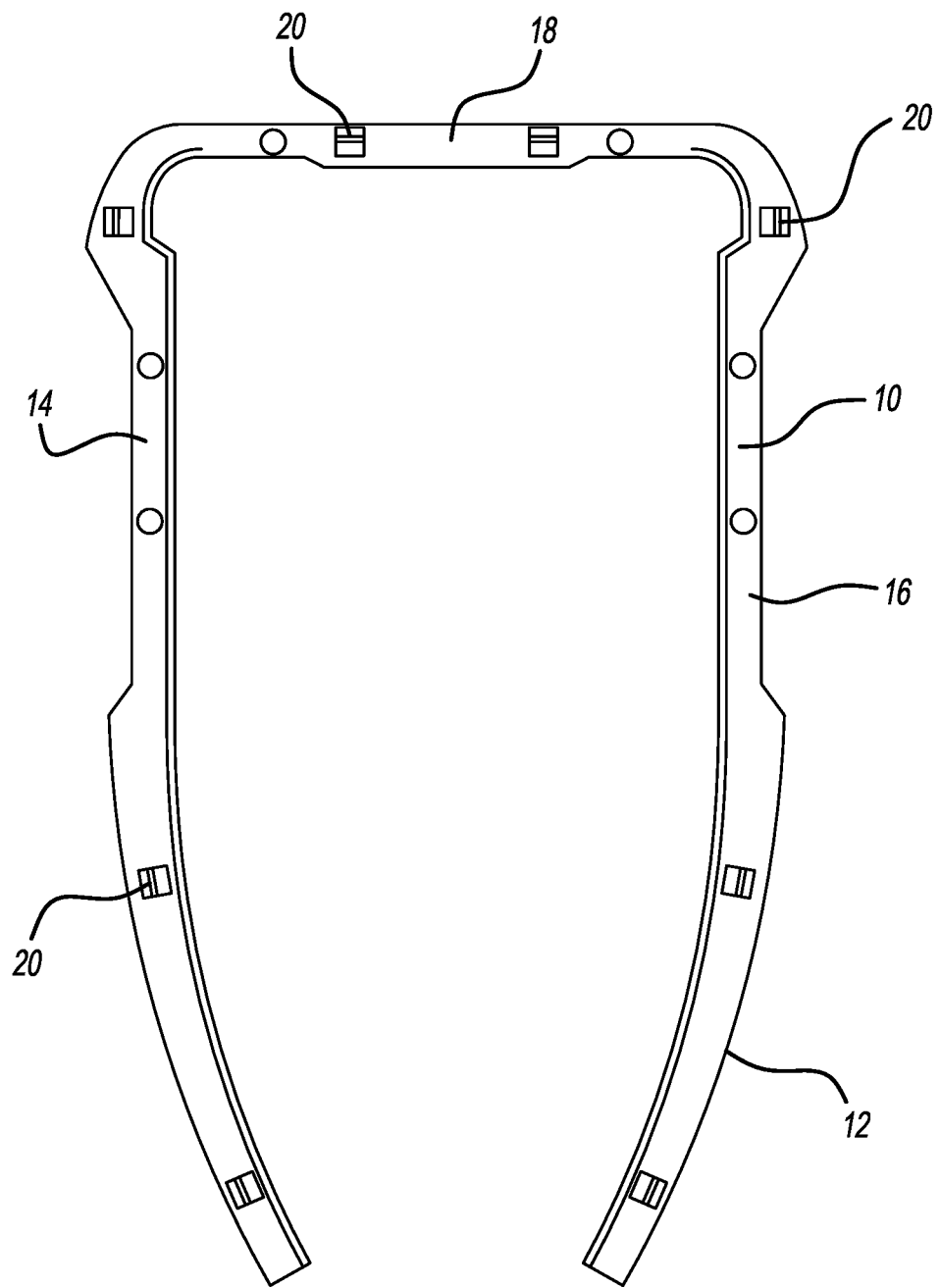
FIG. 1 is a back view of a mold part produced by a method according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following figures, the same reference numerals will be used to refer to the same components. In the following description, various operating parameters and components are described for different constructed forms. These specific parameters and components are included as examples and are not meant to be limiting.

In general, the method and apparatus for providing a way of inhibiting weld lines in a molded-in metallic product having metallic pigment in the resin is discussed hereinafter. The disclosed method and apparatus enable the practical production of a molded-in metal part without weld lines by calculating gate opening times and gate positions when forming the mold. By opening properly positioned gates at certain times during the mold process, undesirable weld lines are reduced and an excellent A-surface results.

More particularly, the present disclosure overcomes the challenges faced by prior art approaches of molding parts with metallic pigment in the resin. Particularly, the present disclosure provides for the use of ferromagnetic pigment in resins and magnetic field adjacent the mold in the injection molding tool to thereby reduce the use of metallic pigment and, as a result, reduce manufacturing cost while providing an excellent A-surface that is substantially free of flow marks and dark spots.

Referring to FIG. 1, a molded-in metallic part 10 produced according to the disclosed method is illustrated. The molded-in metallic part 10 is illustrated for example only, as a wide variety of parts may be produced according to the disclosed method using the illustrated apparatus. Thus the molded-in metallic part 10 is only shown for illustrative purposes and is not intended as being limiting.

The molded-in metallic part 10 shown in FIG. 1 includes a part body 12. The part body 12 includes a first arm 14 and a second arm 16. The first arm 14 and the second arm 16 are connected by an intermediate arm 18. An array of attachment clips 20 are formed in the first arm 14, the second arm 16 and the intermediate arm 18. The attachment clips 20 are strategically located on the part body 12 so as to proper align with fastener holes formed in the substrate (not shown) to which the molded-in metallic part 10 is fitted.

To improve the appearance of the A-surface of the molded-in metallic part 10, the present disclosure further includes a sequential valve gate system and timing opening sequence that can position or inhibit mold lines. This arrangement is illustrated in FIGS. 2 and 3.

Figure 2:
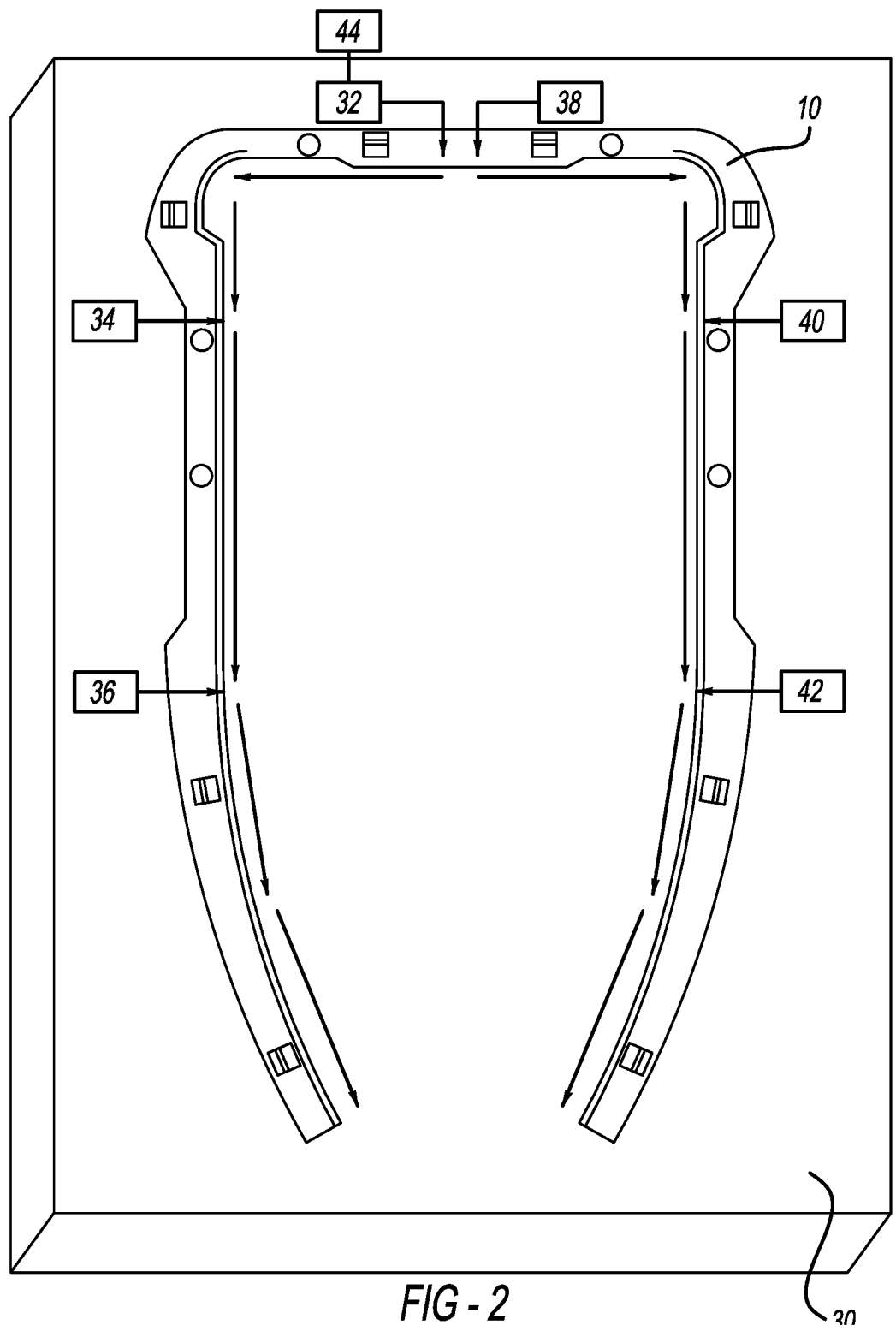
FIG. 2 is an illustration of a mold apparatus having the molded part of FIG. 1 shown therein in association with a series of valve gates.
Figure 3:
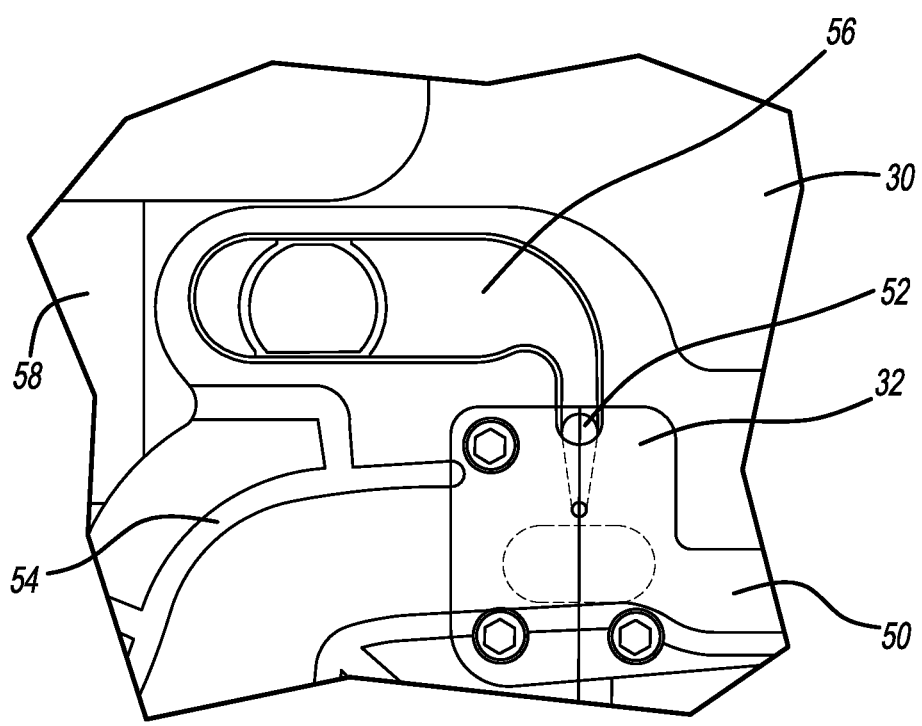
FIG. 3 is an illustration of a portion of the mold apparatus of FIG. 2 illustrating a valve gate in relation to a puck, mold passageways, and a mold cavity.

Referring to FIG. 2, a mold apparatus 30 is shown. The molded-in metallic part 10 is shown within the mold apparatus 30. To form the molded-in metallic part 10, a sequential valve gate system and timing gate opening sequence is applied, thereby positioning or inhibiting weld lines. A series of valve gates is provided that includes a first valve gate 32, a second valve gate 34, a third valve gate 36, a fourth valve gate 38, a fifth valve gate 40 and a sixth valve gate 42. A greater or lesser number of valve gates are possible. Calculation of the total number of valve gates is based on the number required to fill a part while maintaining acceptable, or a predetermined, injection molding pressure. Placement of each valve gates around the mold cavity is made so as to balance the flow length ratio. Arrows indicate the direction of material flow.

The positions of the first valve gate 32, the second valve gate 34, the third valve gate 36, the fourth valve gate 38, the fifth valve gate 40, and the sixth gate 42 are based on the calculated balance flow length ratio. The timing of the opening and closing of the gates is based on the material used and the flow rate from the time the material leaves the first valve gate 32 to the time the flowing material takes to pass the second valve gate 34, and so on, until the flow completely fills the mold cavity. The first valve gate 32, the second valve gate 34, the third valve gate 36, the fourth valve gate 38, the fifth valve gate 40, and the sixth gate 42 are attached to a controller 44. The controller 44 is programmed to regulate the sequence of gate opening and the timing of the gate opening and closing.

After deciding on a primary gate, in this instance the first valve gate 32, a determination is made as to how much time is required for the injected material flow to leave the first valve gate 32 before reaching the second valve gate 34. The second valve gate 34 should be opened immediately after the flow front passes the second valve gate 34. The third valve gate 36 is opened immediately after the flow front passes the third valve gate 36. This pattern continues until all valve gates 32, 34, 36, 38, 40 and 42 are opened. When producing a part without a hole or an opening, weld lines can be positioned or inhibited or even eliminated by proper valve gate location and sequencing the opening of the gates.

The present disclosure provides an additional feature to inhibit surface defects at each of the valve gates. This arrangement is illustrated in FIG. 3 in which a portion of the mold apparatus 30 is shown. The first valve gate 32 is also illustrated, although it is to be understood that the arrangement described herein relative to the first valve gate 32 can apply to any or all of the above-described valve gates.

The first valve gate 32 includes an inlet 50 and an outlet 52. The outlet 52 is fluidly associated with a flow passageway 54 and a puck 56. A mold cavity 58 is formed within the mold apparatus 30 to form the molded part 10. The puck 56 collects the cold plastic remaining from the previous injection shot, thus inhibiting surface defects formed at each gate.

In use, a mold is formed having a part cavity and an electromagnet placed in a location adjacent the part cavity. A quantity of resin is placed in the part cavity, together with a quantity of ferromagnetic pigment. The electromagnet is energized, causing the ferromagnetic pigment to move in the direction of the electromagnetic, thus forming an area of concentrated pigment. This concentrated area is the A-surface once the part is cured. In addition, by forming the part using a sequential valve gate system and timing gate opening sequence, the positioning or elimination of weld lines is possible. The result is a part substantially free of flow marks, dark spots and weld lines on the A-surface.

The above-described logic is only exemplary and it is to be understood that many variations may be made without deviating from the present disclosure as disclosed and described. For example, mold may have more than one mold cavities formed therein for the simultaneous molding of molded-in metallic parts.

One skilled in the art will readily recognize from such discussion, and from the accompanying drawings and claims that various changes, modifications and variations can be made therein without departing from the true spirit and fair scope of the present disclosure as defined by the following claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for molding a part comprising:
    calculating a number of valve gates for a mold cavity;

calculating a position of each valve gate around the mold cavity to balance a flow length ratio;

forming a mold with the mold cavity, wherein the mold comprises a plurality of valve gates equal to the calculated number of valve gates and each of the plurality of valve gates is located at the calculated position of each valve gate around the mold cavity;

injecting material into a first valve gate of the plurality of valve gates;

determining a time for the material to travel from said first valve gate to a second valve gate of the plurality of valve gates; and opening said second valve gate after a flow front of the material passes said second valve gate, wherein the plurality of valve gates are controlled to maintain a predetermined injection molding pressure in the mold cavity.

2. The method for molding a part of claim 1, wherein a material-collecting puck is attached to each of the plurality of valve gates to collect any cold plastic that may remain after a previous injection of material.

3. The method for molding a part of claim 1 further comprising including basing gate timings on a length of time for the material to flow from said first valve gate pass said second valve gate.

4. The method for molding a part of claim 1 further comprising a step of identifying said first valve gate.

5. The method for molding a part of claim 1, wherein said material is metallic.

6. The method for molding a part of claim 1 further comprising attaching a controller to said plurality of valve gates.

7. The method for molding a part of claim 6 further comprising a step of programming said controller to control a time of opening of each of said plurality of valve gates based on a flow rate to inhibit weld lines in the part.

8. A method for molding a part comprising:

calculating a number of valve gates in a mold to fill a part cavity while maintaining a selected molding pressure, wherein the calculated number of valve gates comprises a first valve gate and a second valve gate;

forming a mold having the part cavity with the calculated number of valve gates, wherein each valve gate is positioned around the part cavity to balance a flow length ratio; and inserting flowing material through said valve gates to form a molded-in metallic part using a specific sequence of gate openings according to a selected gate timing, wherein the inserting flowing material through said valve gates comprises injecting material into a first valve gate, determining a time for the material to travel from said first valve gate to a second valve gate, and opening said second valve gate after a flow front of the material passes said second valve gate, wherein the calculated number of valve gates are controlled to maintain the selected molding pressure in the part cavity.

9. The method for molding a part of claim 8 further comprising attaching a material-collecting puck to each valve gate.

10. The method for molding a part of claim 8, wherein the specific sequence of gate openings according to the selected gate timing for the valve gates is based on determining a length of time for the flowing material to reach a downstream valve gate after leaving an upstream valve gate.

11. The method for molding a part of claim 8 further comprising the step of determining a primary valve gate.

12. The method for molding a part of claim 8, wherein said material is a molded-in metallic material.

13. The method for molding a part of claim 8 further comprising attaching a controller to each valve gate.

14. The method for molding a part of claim 13 further comprising programming said controller to control an opening time of said valve gates based on a selected flow rate.

15. The method for molding a part of claim 1, wherein the plurality of valve gates are controlled to maintain the predetermined injection molding pressure in the mold cavity to inhibit weld lines.

\* \* \* \* \*